United States Patent
Passe et al.

(10) Patent No.: US 9,113,131 B1
(45) Date of Patent: Aug. 18, 2015

(54) COVERT MONITORING AND RECORDING OF AUDIO AND VIDEO IN CONTROLLED-ENVIRONMENT FACILITIES

(71) Applicant: Securus Technologies, Inc., Dallas, TX (US)

(72) Inventors: Scott Passe, Forney, TX (US); Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 131 days.

(21) Appl. No.: 14/045,882

(22) Filed: Oct. 4, 2013

(51) Int. Cl.
*H04M 1/64* (2006.01)
*H04N 9/79* (2006.01)
*H04M 3/38* (2006.01)
*H04M 1/725* (2006.01)

(52) U.S. Cl.
CPC ............ *H04N 9/79* (2013.01); *H04M 1/72569* (2013.01); *H04M 3/38* (2013.01)

(58) Field of Classification Search
CPC ....... H04M 1/72569; H04M 3/38; H04N 9/79
USPC ............................ 379/32.01, 35, 88.02, 188
See application file for complete search history.

(56) References Cited

U.S. PATENT DOCUMENTS

| | | | |
|---|---|---|---|
| 6,668,045 B1 * | 12/2003 | Mow | 379/88.19 |
| 7,085,359 B2 * | 8/2006 | Crites et al. | 379/112.01 |
| 8,370,206 B2 * | 2/2013 | Collins | 705/26.1 |
| 2003/0126470 A1 * | 7/2003 | Crites et al. | 713/201 |
| 2007/0041545 A1 * | 2/2007 | Gainsboro | 379/188 |
| 2008/0057976 A1 * | 3/2008 | Rae et al. | 455/456.1 |
| 2011/0213618 A1 * | 9/2011 | Hodge et al. | 705/1.1 |
| 2013/0179210 A1 * | 7/2013 | Collins | 705/7.19 |
| 2013/0311364 A1 * | 11/2013 | Shipman et al. | 705/41 |

* cited by examiner

*Primary Examiner* — Creighton Smith
(74) *Attorney, Agent, or Firm* — Fogarty, L.L.C.

(57) ABSTRACT

Systems and methods for covert monitoring and/or recording of audio and/or video in controlled-environment facilities are disclosed. In some embodiments, a method may include capturing at least one of: an audio, a video, or a picture of one or more residents of a controlled-environment facility using a communication device disposed within the controlled-environment facility, where the communication device is not being used in any communication session during at least a portion of the capturing; and storing the at least one of the audio, video, or picture.

22 Claims, 4 Drawing Sheets

COVERT MONITORING AND RECORDING OF AUDIO AND VIDEO IN CONTROLLED-ENVIRONMENT FACILITIES

TECHNICAL FIELD

This specification relates generally to controlled-environment facilities, and, more particularly, to systems and methods for covertly monitoring and/or recording of audio and/or video in controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install communication devices in different parts of the facility. Such communication devices are generally used to enable inmate communications. For example, at the time of a scheduled visitation, an officer may physically move the inmate from his or her cell or to a communication device or station in a designated area within the correctional facility, where he or she may be able to conduct a remote visitation with friends, family, acquaintances, etc. When the communication is over, the officer may then escort the inmate back to his or her cell.

SUMMARY

Systems and methods for covertly monitoring and/or recording of audio and/or video in controlled-environment facilities are described. In an illustrative, non-limiting embodiment, a method may include capturing at least one of: an audio, a video, or a picture of one or more residents of a controlled-environment facility using a communication device disposed within the controlled-environment facility, where the communication device is not being used in any communication session during at least a portion of the capturing; and storing the at least one of the audio, video, or picture.

In some cases, the one or more residents may be inmates, and the controlled-environment facility may be a correctional facility. The communication device may be located in a pod or cell within the correctional facility. Additionally or alternatively, the communication device may be located in a visitation area within the correctional facility. Additionally or alternatively, the communication device may be a video visitation device.

The communication device may include an electronic display and, during the capturing, the electronic display may not provide any visual indication that the capturing is taking place. Moreover, the communication device may be used in a resident's communication session during another portion of the capturing. For example, the communication session may be selected from the group consisting of: a telephone call, a video visitation session, an electronic chat session, a video telephone call, a text message, a prerecorded video message, a social network message, and an electronic mail message.

The method may further include comparing the at least one of the audio, video, or picture with one or more biometric or non-biometric identifiers, and identifying at least one of the one or more residents based upon the comparison. The method may also include, in response to the identified resident not being authorized to use the communication device, alerting controlled-environment facility personnel of the presence of the identified resident. The method may further include determining whether the identified resident is authorized to access the communication device and, in response to the identified resident not being authorized to access the communication device, recording a communication session taking place through the communication device within a selected time interval of the capturing.

In another illustrative, non-limiting embodiment a method may include enabling real-time inmate communications involving inmates and non-residents of the correctional facility; and capturing at least one of audio or video of one or more inmates of the correctional facility while the communication device is not being used in any inmate communication.

The communication may be configured to provide an indication to the inmates that audio or video is being captured during the real-time inmate communications, and the capturing may occur without the communication device providing the indication. For instance, the communication device may include an electronic display and, during the capturing, the electronic display may not indicate that the capturing is taking place.

The method may also include comparing the captured audio or video with one or more biometric or non-biometric identifiers, and identifying at least one of the one or more inmates based upon the comparison. The method may also include alerting controlled-environment facility personnel in response to a first identified one of the one or more inmates being adverse to a second identified one of the one or more inmates. The method may also include determining a number of inmates in a vicinity of the communication device.

Additionally or alternatively, the method may include issuing an alert in response to a predetermined number of inmates being in the vicinity of the communication device, in response to a selected type of inmate being in the vicinity of another selected type of inmate, in response to a predetermined number of inmates being within a selected physical distance from a correctional facility officer, and/or in response to a selected type of inmate being within a predetermined physical distance from a correctional facility officer.

In yet another illustrative, non-limiting embodiment, a method may include enabling an inmate communication involving one or more inmates of the correctional facility, where the communication device is configured to provide a visual indication to the one or more inmates that audio or video is being captured during the inmate communication and capturing at least one of audio or video of one or more inmates of the correctional facility while the communication device is not being used in any inmate communication and without providing the visual indication. The method may also include determining a number of inmates within range of the communication device and issue an alert in response to the number of inmates meeting a threshold; or comparing the captured audio or video with one or more voice or facial biometric signatures, identifying at least one of the one or more inmates based upon the comparison, and issuing an alert in response to the identified inmate meeting a selected inmate profile.

In some embodiments, one or more of the techniques described herein may be performed via one or more computer systems. In other embodiments, a tangible computer-readable storage medium may have program instructions stored thereon that, upon execution by one or more computer systems, cause the one or more computer systems to execute one or more operations disclosed herein. In yet other embodiments, a system may include at least one processor and a memory coupled to at least one processor. The memory may store program instructions executable by the at least one processor to execute one or more operations disclosed herein.

BRIEF DESCRIPTION OF THE DRAWINGS

Figure 1:
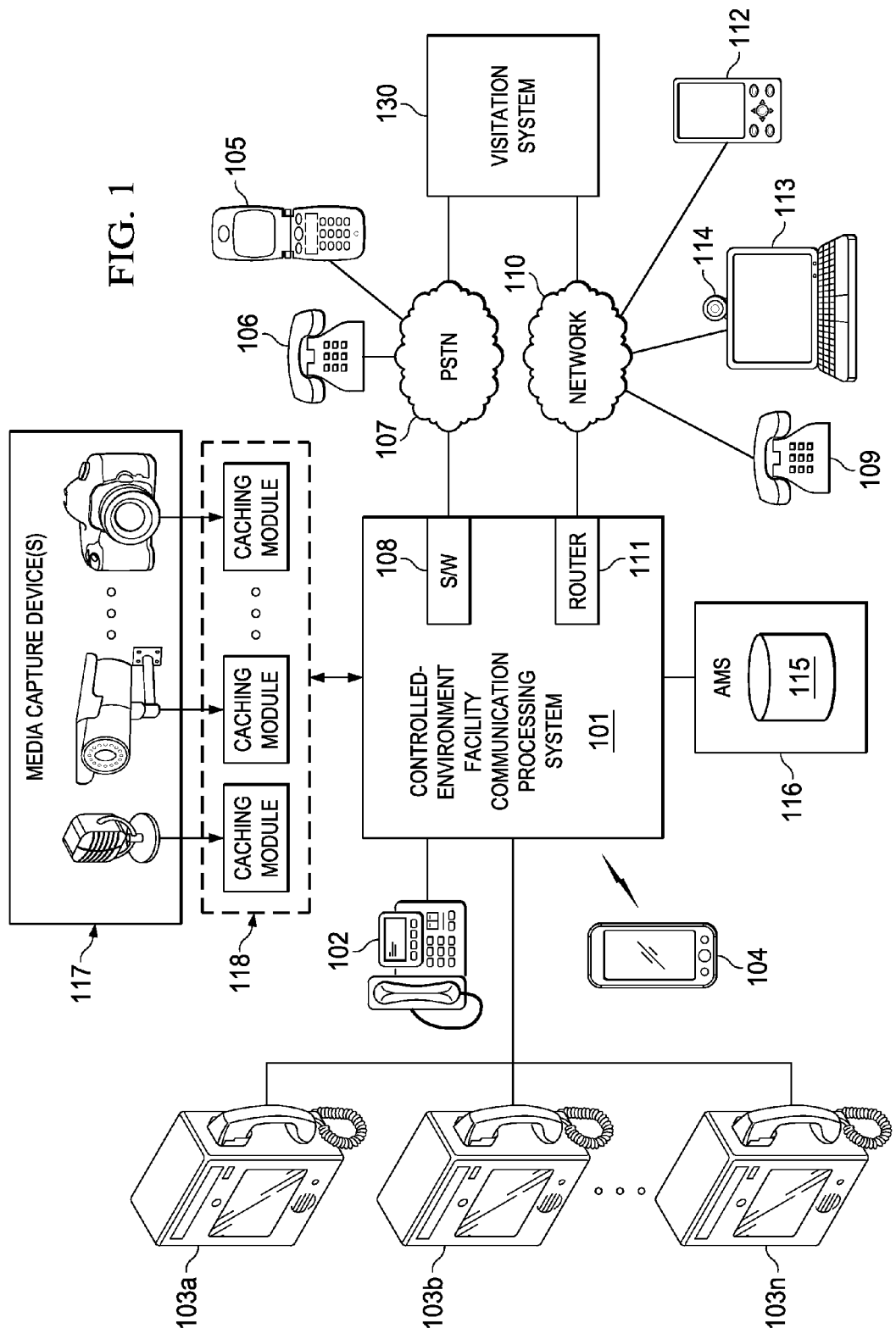

Having thus described the invention in general terms, reference will now be made to the accompanying drawings, which are not necessarily drawn to scale:

FIG. 1 is a block diagram of an example of an environment where a communication system may be employed according to some embodiments.

Figure 2:
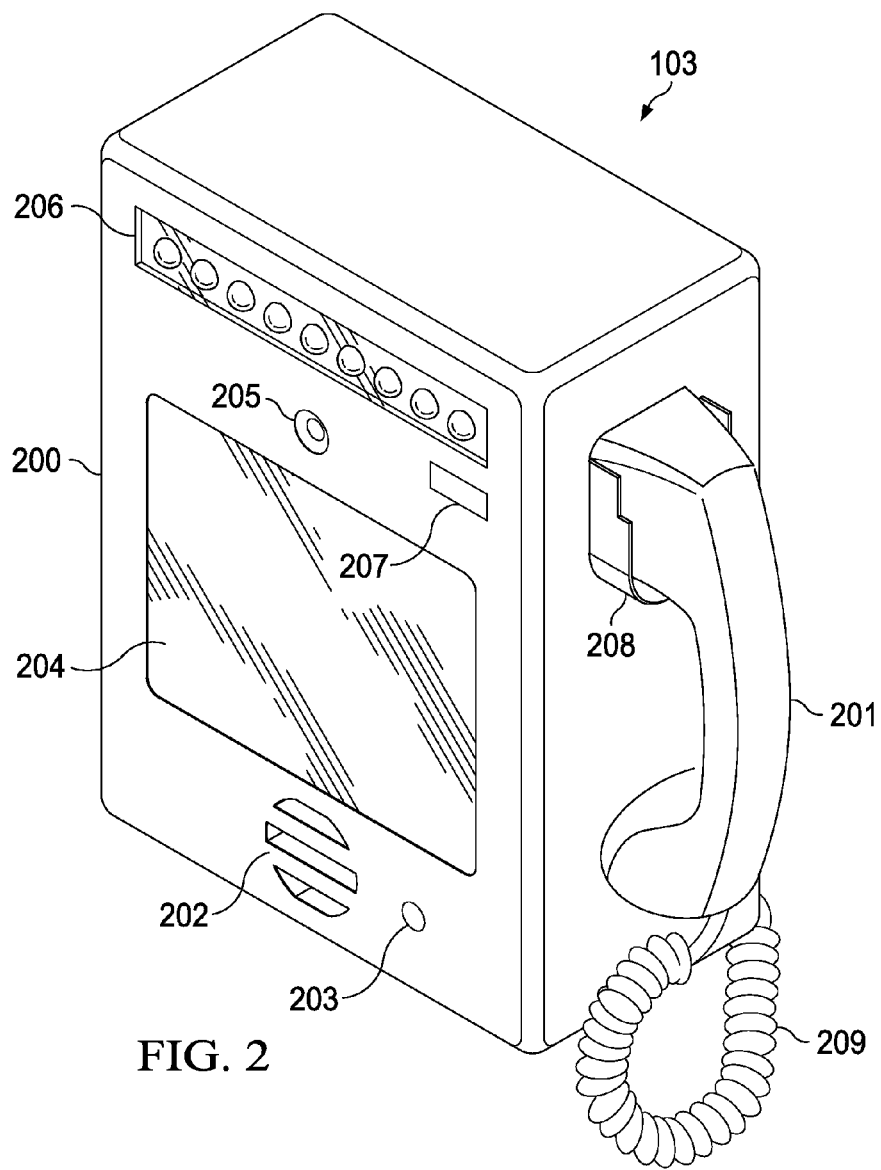

FIG. 2 is a diagram of an example of a communication device according to some embodiments.

Figure 3:
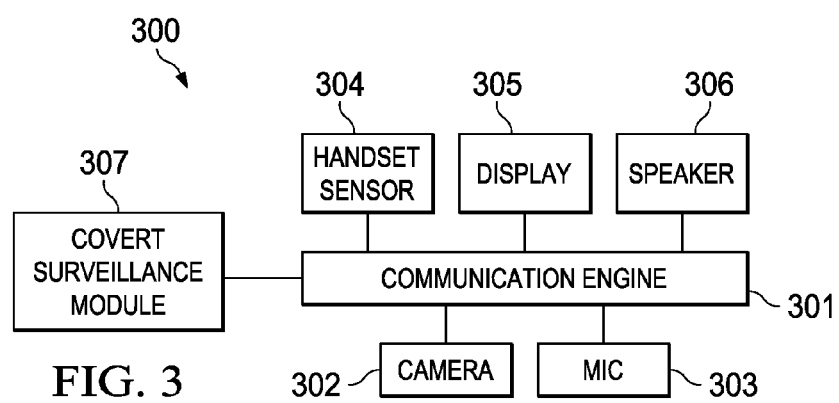

FIG. 3 is a block diagram of an example of communication device software according to some embodiments.

Figure 4:
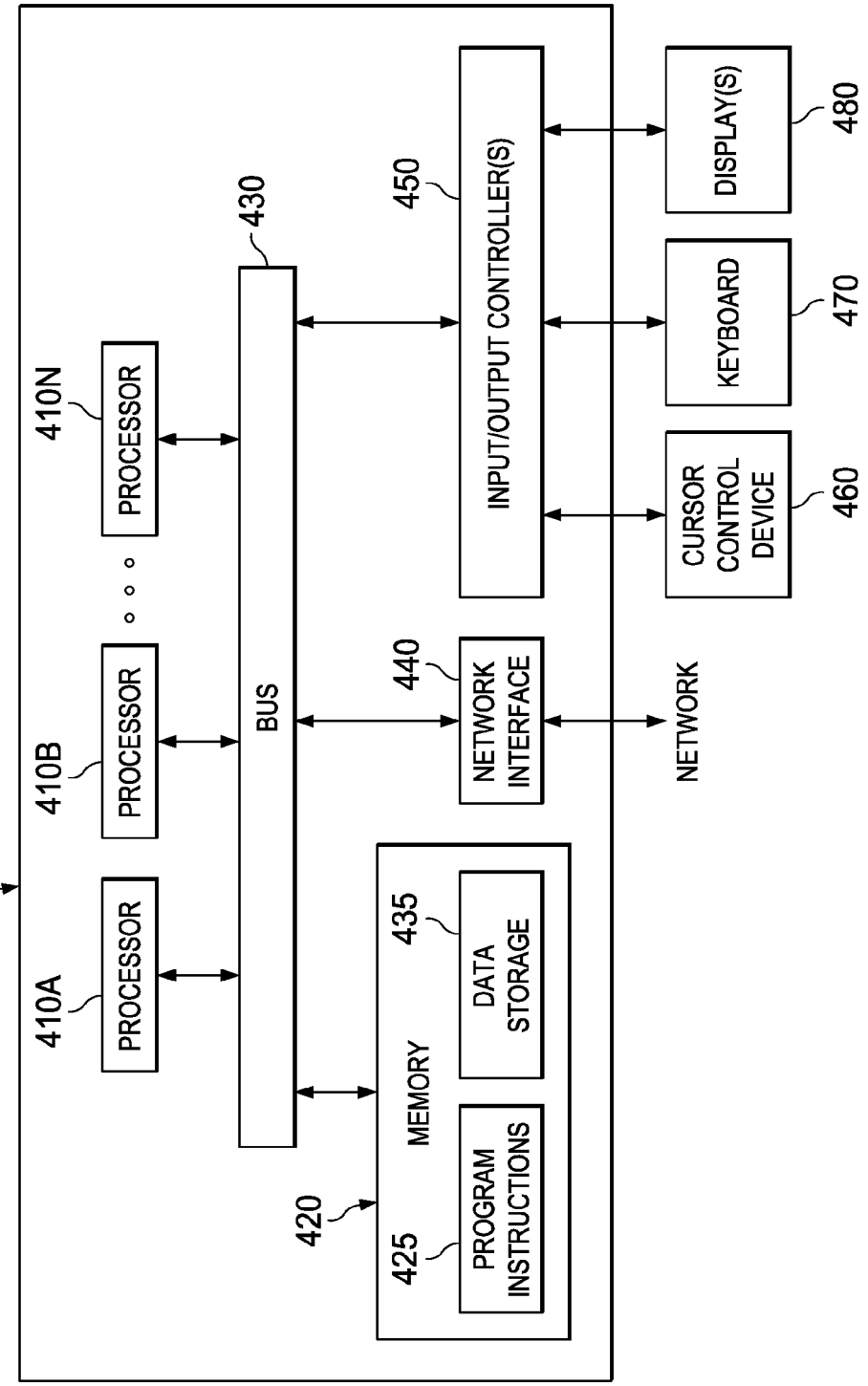

FIG. 4 is a block diagram of an example of a computer system configured to implement various systems and methods described herein according to some embodiments.

Figure 5:
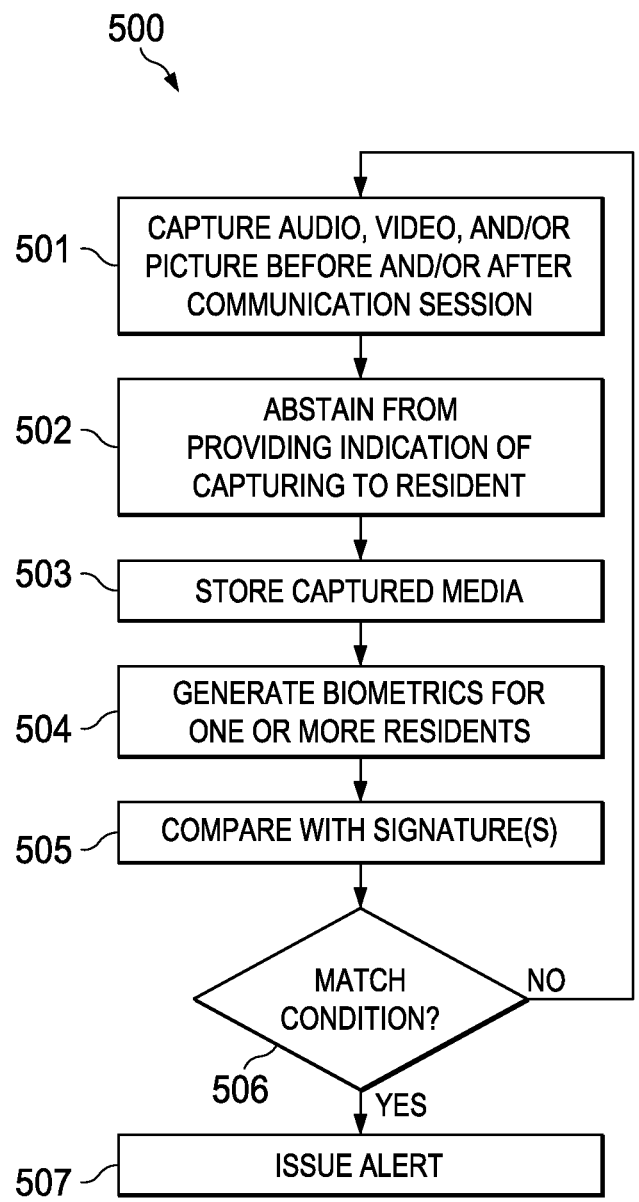

FIG. 5 is a flowchart of an example of a method for covertly monitoring and/or recording of audio and/or video according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for covertly monitoring and/or recording of audio and/or video in controlled-environment facilities. Various types of controlled environment facilities are present in today's society, and persons may be voluntary or involuntary residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled environment facility may be referred to as a jail or prison, and its residents may be referred to as arrestees, detainees, or inmates.

The inventors hereof have recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled environment facilities and their respective residents (e.g., a hospital and its patients) and, in some cases, may be applicable to environments that are not controlled at all.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102-104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103a-n (each collectively referred to as "video visitation device 103") are communication devices with video conferencing and/or multimedia capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate. As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, database 115 may include biometric signatures of inmates (e.g., voice, facial, iris, fingerprint, etc.) and/or of other facility personnel (e.g., correctional officers, staff, etc.). In addition, database 115 may include one or more covert surveillance rules including, for example, the times and dates of scheduled covert monitoring and/or recording, identity of inmates that are the target of ongoing investigations, a maximum threshold number of inmates allowed to be in different areas within the facility at a given time, etc.

In scenarios where communication system 101 is located within the facility, it may have direct access to AMS 116. In other embodiments, however, communication system 101 may be located remotely with respect to the controlled-environment facility (or it may have certain elements disposed within the facility and other elements disposed remotely with respect to the facility) and access to AMS 116 may be obtained via a computer network such as, for example network 110.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some cases, a media capture device 117 may be part of an existing security surveillance infrastructure within a controlled-environment facility. In other cases, media capture devices 117 (e.g., cameras, camcorders, microphones, audio recorders, etc.) may be installed in physical proximity to communication device(s) 102-104 (e.g., in a visitation room or in the same pod, wing etc.) but be nonetheless distinct from those communication devices. In operation, communication system 101 may command a corresponding one of media caching modules 118 to stream through live video, image and/or audio content from a respective one of media capture devices 117 for covertly monitoring and/or recording of audio and/or video in the facility. In some embodiments, investigators from any jail or facility may be allowed to access any camera in any other jail or facility for investigative purposes.

FIG. 2 is a diagram of a video visitation device 103. In some embodiments, device 103 may be implemented as a computer-based system such as described in connection with FIG. 4. Also, in some implementations, video visitation device 103 may be located in a pod, which is a separate and self-contained housing unit within a correctional facility designed to hold a number of inmates (e.g., ~12 to 50 prisoners). A small number of prison officers (e.g., ~2 or 3), and sometimes a single officer or other facility personnel, supervise each pod. Each pod may contain tiers of cells arranged around a central control station or desk from which a single officer can monitor all the cells and the entire pod, control cell doors, and communicate with the rest of the inmates. Additionally or alternatively, video visitation device 103 may be disposed in a visitation area of the correctional facility. In other embodiments, video visitation device 103 may be disposed outside of the correctional facility.

As illustrated, device 103 includes display 204, camera 205, and handset 201 coupled to device 103 via wire 209. Display 204 may be any suitable electronic display such as, for example, a Liquid Crystal Display (LCD), a touchscreen display (e.g., resistive, capacitive, etc.), or the like, whereas camera 205 may be a suitable imaging device such as, for instance, a video camera or webcam equipped with Charge-Coupled Devices (CCDs), Complementary Metal-Oxide-Semiconductor (CMOS) active pixel sensors, etc. Handset 201 may be similar to a traditional telephone handset including an earpiece portion (with a loudspeaker), a handle portion, and a mouthpiece portion (with a microphone).

During a video visitation session, video visitation device 103 may be configured to capture a video image of an inmate to be transmitted to a non-resident using camera 205, and to display a video image of the non-resident to the inmate using display 204. Video visitation device 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in the "on hook" position) when device 103 is not in use. Furthermore, handset holder 208 may include a mechanical or electromechanical switch or sensor (not shown) that senses when handset 201 is its not resting against it (e.g. in the "off hook" position).

It should be noted that, outside of correctional facilities, video visitation device 103 may assume the form of any computer, tablet computer, smart phone, etc., or any other consumer device or appliance with videoconferencing capabilities. Meanwhile, in the context of correctional facilities, video visitation device 103 may include one or more tampering/impact resistant or hardened elements configured to protect them from vandalism or otherwise destructive acts. For example, one or more of devices 202-207 may be protected by a transparent plastic or thermoplastic (e.g., Plexiglas, etc.) material.

FIG. 3 is a block diagram of an example of communication device software 300. In some embodiments, software 300 may be executed, at least in part, by communication device 103 shown in FIG. 2. As illustrated, software 300 may include communication engine 301, camera/video capture interface module 302, microphone/audio capture interface module 303, handset sensor module 304, display module 305 and loudspeaker module 306. Other modules not shown in FIG. 3 for sake of brevity may include, but are not limited to, a user interface module (configured to allow a user to interact with software 300 and/or visitation system 130) and an AMS interface (configured to allow software 300 to access information stored in database 115).

In various embodiments, communication engine 301 may be configured to perform communication and/or visitation operations such as, for example, authenticate the identity of an inmate and exchange one or more messages with communication system 101, visitation system 130, and or devices 112 or 113 over network 110 to initiate an inmate communication session. During an inmate communication session, engine 301 may utilize camera/video capture interface module 302 and/or microphone/audio capture interface module 303 to provide the non-resident with video and/or audio captured from the inmate. Display module 305 and/or loudspeaker module 306 may be configured to provide an inmate with video and/or audio produced by a non-resident during the inmate communication session. Meanwhile, handset sensor 304 may include a touch sensor, a heat sensor, or a biometric sensor configured to physically detect presence of an inmate operating device 103.

Covert surveillance module 307 may be configured to perform one or more operations for covertly monitoring and/or recording of audio and/or video as described in detail in connection with the example shown in FIG. 5. Covert surveillance module 307 may also monitor and/or record key strokes or other user input received via a communication device's touch screen. In some cases, covert surveillance module 307 may be implemented, at least in part, in device 103. Additionally or alternatively, covert surveillance module 307 may be implemented, at least in part, by communications system 101.

In certain embodiments, each of the different components of visitation software 300 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation software 300 may be partitioned into components in a different fashion than illustrated in FIG. 3.

Embodiments of systems and methods for covertly monitoring and/or recording of audio and/or video in controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, blocks 101, 116, or 130, shown in FIG. 1 may include computer system 300. Moreover, communication devices 103-105, 112, and 113 may be implemented as computer system 300. As explained above, in different embodiments these various computer systems may be configured to communicate with each other in any suitable way, such as, for example, via network 110.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460-480 may be capable of communicating with I/O controllers 450, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 420 as program instructions 425 and data storage 435, respectively. In other embodiments, program instructions and/or data may be received, sent or stored upon different types of computer-accessible media or on similar media separate from system memory 420 or computer system 400.

Generally speaking, a computer-accessible medium may include any tangible or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the device, including network interface 440 or other peripheral interfaces, such as input/output devices 450. In some embodiments, bus 430 may perform any necessary protocol, timing or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all of the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements shown in FIG. 3, which may be configured to effect the operations shown in FIG. 5. Program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Referring back to FIG. 1, video visitation devices 103 (as well as other communication devices 102 through 104) have traditionally been used only for facilitating inmate communications, and not for covert monitoring and/or recording of audio and/or video. In other words, although video visitation devices 103 are configured to capture audio and/or video from an inmate during an inmate's communication, the inmate is aware of such capturing because, after all, the ongoing communication is enabled by that very device. Also, in some cases, video visitation device 103 may provide an explicit indication that audio and/or video are being captured (e.g., an audio cue, a message on a display, etc.). Before an actual communication begins and after the communication ends, however, video visitation devices 103 do not capture audio and/or video.

In contrast with the foregoing, in some embodiments described herein, communication system 101 and/or communication devices 102-104 may be configured to covertly monitor and/or record audio and/or video using communication devices 102-104 in a manner that is hidden or concealed from residents of the controlled-environment facility, for example, through operation of covert surveillance module 307. In some cases, monitoring and/or recording activities may occur, at least in part, prior to a communication device being used to start an inmate communication session and/or after the communication has ended, and/or without providing an indication to the residents that audio and/or video are being captured.

FIG. 5 is a flowchart of an example of a method for covertly monitoring and/or recording of audio and/or video. In some embodiments, method 500 may be performed by covert surveillance module 307 operating or executing within communication devices 102-104 and/or communications system 101. At block 501, method 500 includes capturing at least one of: an audio, a video, or a picture of one or more residents of a controlled-environment facility using a communication device disposed within the controlled-environment facility. The operation of block 501 may occur such that, at least during a portion of the capturing, the communication device is not being used in any communication session.

For example, the capturing may occur, at least in part, before and/or after a communication session. These communication sessions may include, but are not limited to, a telephone call, a video visitation session, an electronic chat session, a video telephone call, a text message, a prerecorded video message, a social network message, an electronic mail message, etc. As such, inmate communications may include real-time or non-real-time communications, which may often involve inmates and non-residents of a correctional facility.

At block 502, method 500 may abstain from providing any indication of the capturing to the resident in the vicinity of the communication device (e.g., in the same pod or visitation area). For example, the communication device may include an electronic display that would ordinarily indicate to an inmate that a communication session is ongoing. During the capturing of block 501, however, the communication device may be configured such that the electronic display does not provide any visual indication that any audio, video, or image capture is taking place. In other cases, the communication device may indicate that one type of capture is being performed (e.g., that a telephone call is going, therefore audio is being captured), but may abstain from indicating that another type of capture (e.g., a video and/or picture) is ongoing.

In yet other cases, the communication device may provide a display that deceives or misleads the resident into thinking that a particular type of capture is not taking place. For instance, a visual message to the effect that "A Voice-Only Telephone Call is Now in Progress" may be displayed, but the communication device may in fact also be capturing a video or pictures of the resident during the call.

At block 503, method 500 may include storing a media file with the captured audio, video, and/or picture. At block 504, method 500 may include generating one or more biometric signatures from the media file using any suitable method known in the art. Then, at block 505, method 500 may include comparing the generated biometric signatures with previously stored biometric signatures to identify one or more parties present in the video, audio, and/or picture; and/or to identify a number of parties present in the video, audio, and/or picture. Examples of biometric signatures include, but are not limited to, fingerprint, face recognition, palm prints, hand geometry, iris or retina recognition, odor or scent, voice recognition, gait analysis, tattoo recognition, etc.

In alternative embodiments, non-biometric features may also be used to identify one or more parties or a number of parties. Examples of non-biometric features include, but are not limited to, resident Personal Identification Numbers (PINs), resident Radio Frequency Identification (RFID) tags (e.g., bracelets, anklets), resident bar codes, etc.

At block 506, method 500 may include determining whether results of the comparison match one or more predetermined conditions. If the condition of block 506 is not met, then method 500 returns to block 501. Otherwise, at block 507, an alert may be issued to facility personnel, other facility officers, etc.

For example, in some implementations, two or more inmates may be identified, and a first inmate may be determined to be adverse to a second inmate. For instance, the first inmate may belong to a given gang, group, or organization, and the second inmate may be affiliated with an opposing gang, group, or organization. In other implementations, facility personnel may choose a maximum number of inmates that can be present in the vicinity of the communication device, and block 506 may include determining whether the number of parties identified within range of the communication device meets or exceeds that threshold number. In yet other implementations, block 505 may have identified a correctional facility officer, and facility personnel may select a maximum number of inmates that can be present within a selected physical distance (e.g., 5 feet, 10 feet, etc.) of the officer at a given time. If one or more of these various conditions is met, the alert may be issued.

Similar conditions in block 506 may be evaluated depending upon a type of inmate or inmate classification system. For example, inmates known to be violent may be classified as belonging to a first type or group, and inmates known to be peaceful may be classified into a different type or group. Thus, a greater number of violent inmates in the vicinity of an otherwise non-violent inmate may cause an alert to be issued in block 507. In some cases, inmates incarcerated for offenses carrying shorter prison terms may be classified differently than long-term inmates. Also, inmates currently under investigation may be classified into a group separate from other inmates. Other classification systems will be apparent to a person of ordinary skill in the art in light of this disclosure.

The various systems and methods illustrated in the figures and described herein represent example embodiments of systems and methods for covert monitoring and recording of audio and video in controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
capturing at least one of: an audio, a video, or a picture of one or more residents of a controlled-environment facility using a communication device disposed within the controlled-environment facility, wherein the communication device is not being used in any communication session during at least a portion of the capturing; and
storing the at least one of the audio, video, or picture.

2. The method of claim 1, wherein the one or more residents are inmates, and wherein the controlled-environment facility is a correctional facility.

3. The method of claim 2, wherein the communication device is located in a pod or cell within the correctional facility.

4. The method of claim 2, wherein the communication device is located in a visitation area within the correctional facility.

5. The method of claim 1, wherein the communication device is a video visitation device.

6. The method of claim 1, wherein the communication device includes an electronic display and wherein, during the capturing, the electronic display does not provide any visual indication that the capturing is taking place.

7. The method of claim 1, wherein the communication device is used in a resident's communication session during another portion of the capturing.

8. The method of claim 1, further comprising comparing the at least one of the audio, video, or picture with one or more biometric or non-biometric identifiers, and identifying at least one of the one or more residents based upon the comparison.

9. The method of claim 8, further comprising, in response to the identified resident not being authorized to use the communication device, alerting controlled-environment facility personnel of the presence of the identified resident.

10. The method of claim 8, further comprising, determining whether the identified resident is authorized to access the communication device and, in response to the identified resident not being authorized to access the communication device, recording a communication session taking place through the communication device within a selected time interval of the capturing.

11. The method of claim 1, wherein the communication session is selected from the group consisting of: a telephone call, a video visitation session, an electronic chat session, a video telephone call, a text message, a prerecorded video message, a social network message, and an electronic mail message.

12. A non-transitory computer-readable storage medium having program instructions stored thereon that, upon execution by a communication device disposed within a correctional facility, cause the communication device to:
  enable real-time inmate communications involving inmates and non-residents of the correctional facility; and
  capture at least one of audio or video of one or more inmates of the correctional facility while the communication device is not being used in any inmate communication.

13. The non-transitory computer-readable storage medium of claim 12, wherein the communication device is configured to provide an indication to the inmates that audio or video is being captured during the real-time inmate communications, and wherein the capturing occurs without the communication device providing the indication.

14. The non-transitory computer-readable storage medium of claim 13, wherein the communication device includes an electronic display and wherein, during the capturing, the electronic display does not indicate that the capturing is taking place.

15. The non-transitory computer-readable storage medium of claim 12, wherein the program instructions, upon execution by the communication device, further cause the communication device to compare the captured audio or video with one or more biometric or non-biometric identifiers, and identify at least one of the one or more inmates based upon the comparison.

16. The non-transitory computer-readable storage medium of claim 15, wherein the program instructions, upon execution by the communication device, further cause the communication device to alert controlled-environment facility personnel in response to a first identified one of the one or more inmates being adverse to a second identified one of the one or more inmates.

17. The non-transitory computer-readable storage medium of claim 12, wherein the program instructions, upon execution by the communication device, further cause the communication device to determine a number of inmates in a vicinity of the communication device.

18. The non-transitory computer-readable storage medium of claim 17, wherein the program instructions, upon execution by the communication device, further cause the communication device to issue an alert in response to a predetermined number of inmates being in the vicinity of the communication device.

19. The non-transitory computer-readable storage medium of claim 17, wherein the program instructions, upon execution by the communication device, further cause the communication device to issue an alert in response to a selected type of inmate being in the vicinity of another selected type of inmate.

20. The non-transitory computer-readable storage medium of claim 17, wherein the program instructions, upon execution by the communication device, further cause the communication device to issue an alert in response to a predetermined number of inmates being within a selected physical distance from a correctional facility officer.

21. The non-transitory computer-readable storage medium of claim 17, wherein the program instructions, upon execution by the communication device, further cause the communication device to issue an alert in response to a selected type of inmate being within a predetermined physical distance from a correctional facility officer.

22. A communication device disposed within a correctional facility, the communication device comprising:
  at least one processor; and
  a memory coupled to the at least one processor, the memory configured to store program instructions executable by the at least one processor to cause the communication device to:
    enable an inmate communication involving one or more inmates of the correctional facility, wherein the communication device is configured to provide a visual indication to the one or more inmates that audio or video is being captured during the inmate communication;
    capture at least one of audio or video of one or more inmates of the correctional facility while the communication device is not being used in any inmate communication and without providing the visual indication; and
    at least one of:
      determine a number of inmates within range of the communication device and issue an alert in response to the number of inmates meeting a threshold; or
      compare the captured audio or video with one or more voice or facial biometric signatures, identify at least one of the one or more inmates based upon the comparison, and issue an alert in response to the identified inmate meeting a selected inmate profile.

* * * * *